United States Patent [19]

Akiyama et al.

[11] Patent Number: 5,081,525
[45] Date of Patent: Jan. 14, 1992

[54] OPTO-ELECTRIC CONVERTING IMAGE PICKUP ELEMENT AND IMAGE PICKUP APPARATUS EMPLOYING THE SAME

[75] Inventors: Toshiyuki Akiyama, Tokorozawa; Itaru Mimura, Sayama; Kenji Takahashi, Tsukui; Naoki Ozawa, Akishima; Takahiro Matsumoto, Hachioji, all of Japan

[73] Assignee: Hitachi Denshi Kabushikigaisha, Tokyo, Japan

[21] Appl. No.: 470,068

[22] Filed: Jan. 25, 1990

[30] Foreign Application Priority Data

Jan. 30, 1989 [JP] Japan .................. 1-17648

[51] Int. Cl.⁵ .............. H04N 9/093; H04N 9/097; H04N 5/30; H04N 7/18
[52] U.S. Cl. .................. 358/51; 318/50; 318/105; 318/209
[58] Field of Search .............. 358/51, 50, 209, 102

[56] References Cited

U.S. PATENT DOCUMENTS

| | | | |
|---|---|---|---|
| 3,764,735 | 10/1973 | Dieter-Schneider et al. | 358/51 |
| 4,383,272 | 5/1983 | Netravali et al. | 358/105 |
| 4,503,456 | 3/1985 | Nakamura et al. | 358/51 |
| 4,593,311 | 6/1986 | Levine | 358/51 |
| 4,668,986 | 5/1987 | Furukawa | 358/105 |
| 4,733,296 | 3/1988 | Honbo et al. | 358/51 |
| 4,835,594 | 5/1989 | Kihara | 358/51 |
| 4,851,904 | 7/1989 | Miyazaki et al. | 358/105 |

FOREIGN PATENT DOCUMENTS

89790 5/1986 Japan .
89791 5/1986 Japan .

*Primary Examiner*—Howard W. Britton
*Assistant Examiner*—Glenton B. Burgess
*Attorney, Agent, or Firm*—Fay, Sharpe, Beall, Fagan, Minnich & McKee

[57] ABSTRACT

In an image pickup apparatus, an interpolation signal for interpolating a discrepancy of registration is calculated from signals of (M × N) pieces of arranged elements (M, N being an integer, respectively) the positions of which on a light receiving plane are mutually adjoined with each other among arranged elements corresponding to signals in 2 fields which are continuously output from the respective image pickup elements, whereby the registration error can be corrected. An image pickup element has such a structure that signals having the same element number as an arranged element number corresponding to mutually continuous 2 field signals among the signals read during the normal interlace operation are entirely independently read every 1 field. By utilizing such an image pickup element having the element numbers two times higher than that of the conventional element, the registration error is interpolated from the signals of (M × N) pieces of the mutually adjoining arranged elements corresponding to the 1 field signal.

12 Claims, 10 Drawing Sheets

8 POSITION OF DISCREPANT IMAGE

7 POSITION OF ARRANGED ELEMENT

OPTO-ELECTRIC CONVERTING IMAGE PICKUP ELEMENT AND IMAGE PICKUP APPARATUS EMPLOYING THE SAME

BACKGROUND OF THE INVENTION

The present invention relates to an image pickup apparatus including an opto-electric converting image pickup element, and, more specifically, to a correction method and a correction circuit for correcting registration.

At present, triple-tube color television cameras employing three image pickup tubes (red tube R, green tube G and blue tube B) have been widely utilized in broadcasting stations and the like. On the other hand, being backed in recent years by rapid developments of a solid-state image pickup element, 3-chip type color television cameras employing solid-state image pickup device instead of the image pickup tube have been commonly used.

In the case where three image pickup devices (either image pickup tubes or solid-state image pickup elements) are utilized, if registrations of respective color images are not sufficient (will be shortly referred to as a "registration discrepancy"), positions of the images contained in the television signal will be different from each other with respect to each color. Color blurring phenomenon results resolution is lowered. Therefore, the image quality is deteriorated. Under these circumstance, the pattern images of the respective pickup tubes, or pickup devices of both the multi tube type and multi plate type color television cameras must be registered at a higher precision.

It should be noted that one of causes of a registration error is lens aberration. The amount of aberration varies by a distance measured from a center, a color of light, a zooming ratio, an amount of diaphragm, a distance measured from a subject, and so on. In the camera employing a solid-state image pickup device circuit for reducing the aberration as shown in FIG. 1 has been proposed (Japanese Laid-open Patent Application No. 61-89790 and Japanese Laid-open Patent Application No. 61-89791).

Figure 1:
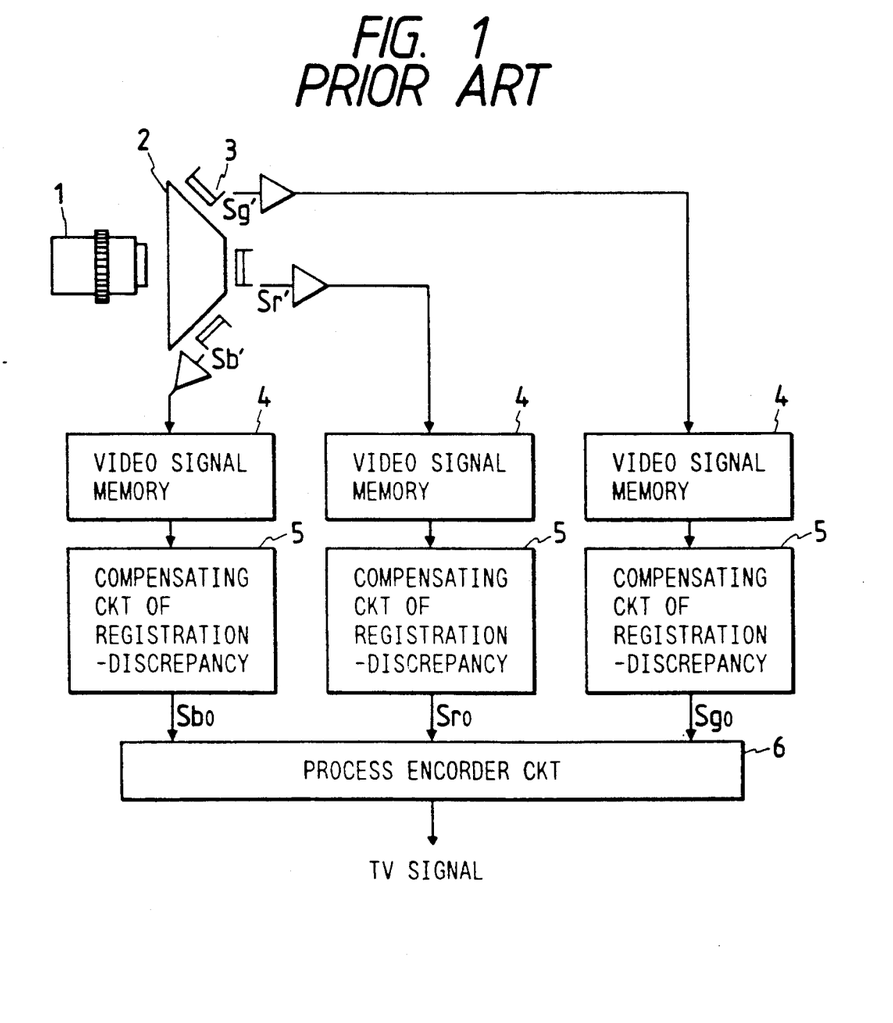
FIG. 1 illustrates a schematic arrangement of the conventional registration correction circuit apparatus.
Figure 2:
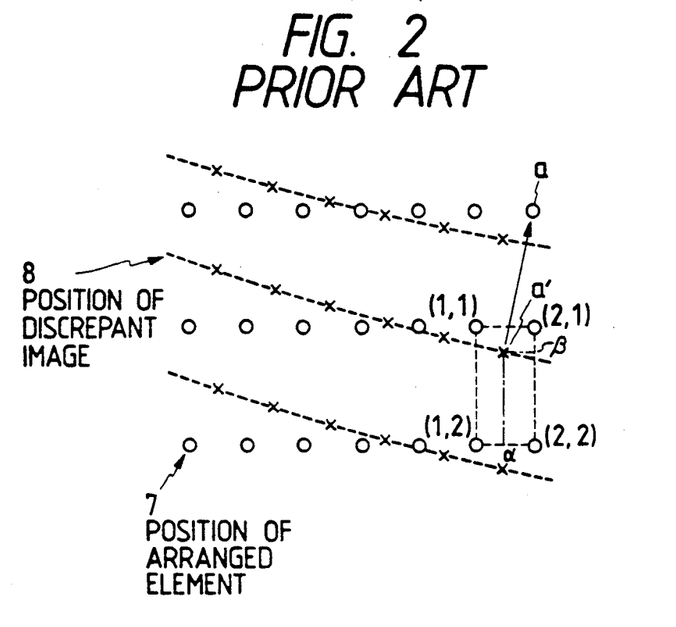
FIG. 2 is an illustration for explaining an operation of the conventional apparatus.

In FIG. 1, incident light has been slit into three colors R, G, B via a lens 1 and a prism 2, and three color lights are converted into electric signals (referred to as "color signals" by image pickup devices) Sr', Sg', and Sb' and output therefrom. FIG. 2 illustrates both a position (referred to as a "position of an arranged element") 7 at a light receiving plane of the image pickup device, for obtaining the output signal in this case, for instance, the output signal Sr' shown in FIG. 1, and also another position 8 of a real image having a registration error caused by a setting error of the image pickup device and the color aberration of the lens. The image position that must be focused onto the position "a" of the arranged element by way of the ideal optical error, is positionally shifted to the point "a'" due to the registration error. An amount of light at this point a' is detected and when the detected light amount is handled as an amount of light at the point "a", the above-described registration error can be corrected. However, as apparent from the drawing, the point a' is not always present on the position of the arranged element.

Therefore, the conventional correction of the registration error with respect to such an output signal represented in FIG. 1 is carried out as follows. That is, several lines of the output signals Sr' (within 1 field) are once stored in a video signal memory 4. In a memory and calculator of a discrepancy of registration 5, the value obtained at a predetermined registration discrepancy position a' is acquired by interpolation values of four element points (1,1) to (2,2) adjacent to the first-mentioned point a' as represented in FIG. 2, and an interpolation signal obtained by this internal calculation is used as a signal of a corresponding correct arranged element position "a", and thus a color signal Sr a discrepancy of registration of which has been corrected is output. Thereafter, other color signals Sro, Sgo, and Sbo whose discrepancy of registrations have been corrected in the similar method are supplied to a process encoder circuit 6 so as to be output as a television signal.

In the circuit shown in FIG. 1 since the corrections of the registration discrepancy are added to the signals (1-field signals) output from the respective image pickup elements Sr', Sg' and Sb', the color blurring phenomenon and low resolution can be prevented. However, the conventional apparatus still has the below-mentioned problems.

Figure 3:
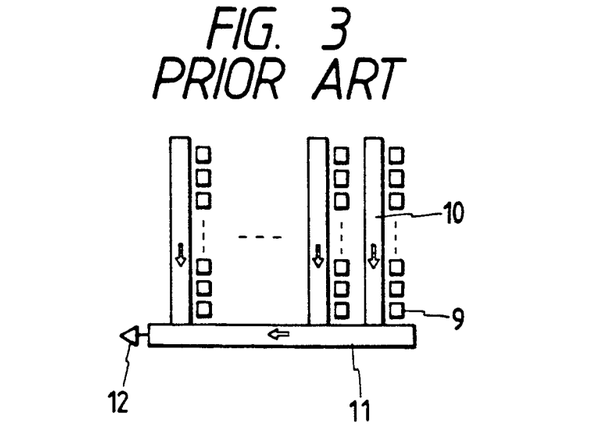
FIG. 3 is a construction of a major portion of the above-described conventional apparatus.

It should be noted that FIG. 3 illustrates a construction example of a CCD type solid-state image pickup device, reference numeral 9 indicates a photodiode, reference numeral 10 denotes a CCD in a vertical direction, reference numeral 11 represents a CCD in a horizontal direction, and reference numeral 12 is a source follower circuit.

Figure 4A:
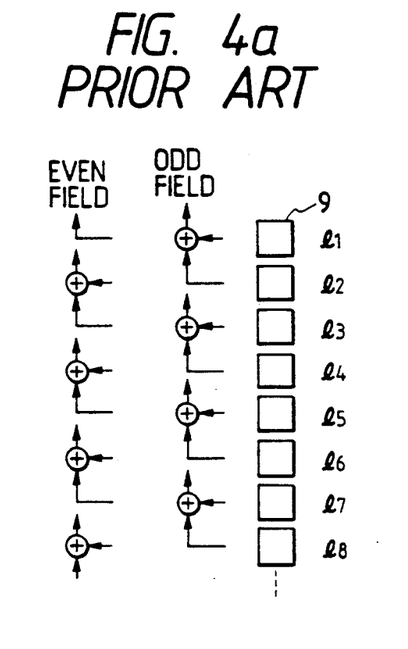
FIGS. 4a and 4b are illustrations for explaining operations of the major portion of the above-explained conventional apparatus.
Figure 4B:
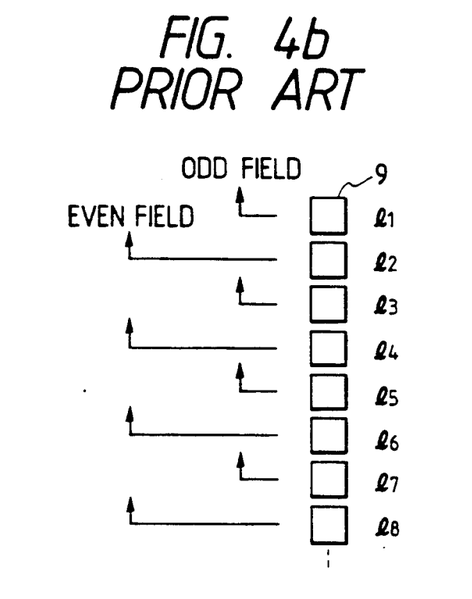

Since the interlace scanning operation is performed in the normal television system, readout of the video signal from the solid-state image pickup devices of the multi plate type camera is carried out as follows. That is to say, as illustrated in FIG. 4a, a mixture signal obtained from two vertical picture elements is alternatively combined with each other such as $l_1+l_2$, and $l_2+l_3$ every 1 screen (1 field) so as to be output. Otherwise, as represented in FIG. 4b, signals obtained from every two picture elements (lines) such as $l_1, l_3$;—, and $l_2, l_4$; —are alternately read out every 1 screen (1 field).

As a result, the number of the arranged elements contained in 1 screen (1 field) signal is equal to approximately a half of the picture element numbers of the actual pickup device. In accordance with the conventional registration correction circuit shown in FIG. 1, since the interpolation signal is calculated by using only the signals having a small quantity of pixel points, only the pictures having the low improvement in the resolution along the vertical direction are obtained.

SUMMARY OF THE INVENTION

An object of the present invention is to achieve a more accurate correction means of a registration error than the conventional registration error correction means.

To achieve the above-described object, in accordance with the present invention, an interpolation signal for interpolating a discrepancy of registration is calculated from signals of M×N (M and N being an integer) arranged elements, the corresponding positions on the light receiving plane of which are juxtaposed with each other, among the arranged elements corresponding to 2 fields signals continuously output from the respective image pickup elements.

Furthermore, an image pickup device having a construction to read signals during a normal interlace operation having an arranged element number equal that of mutually continuous 2 field signals independently read every 1 field is employed. An interpolation signal for interpolating a discrepancy of registration is calculated from signals of mutually adjoining M×N (M and N being an integer) arranged elements among arranged elements of a 1-field signal having element numbers two times higher than the normal element number. As a consequence, according to the present invention, the number of the arranged elements, in the vertical direction, of the signal used for interpolating the discrepancy of registration becomes approximately two times higher than that of the arranged elements of the conventional 1 field signal. Thus, it is possible to obtain an image having higher resolution than that of the image obtained by utilizing the conventional registration correction circuit.

DESCRIPTION OF THE PREFERRED EMBODIMENTS

Figure 5:
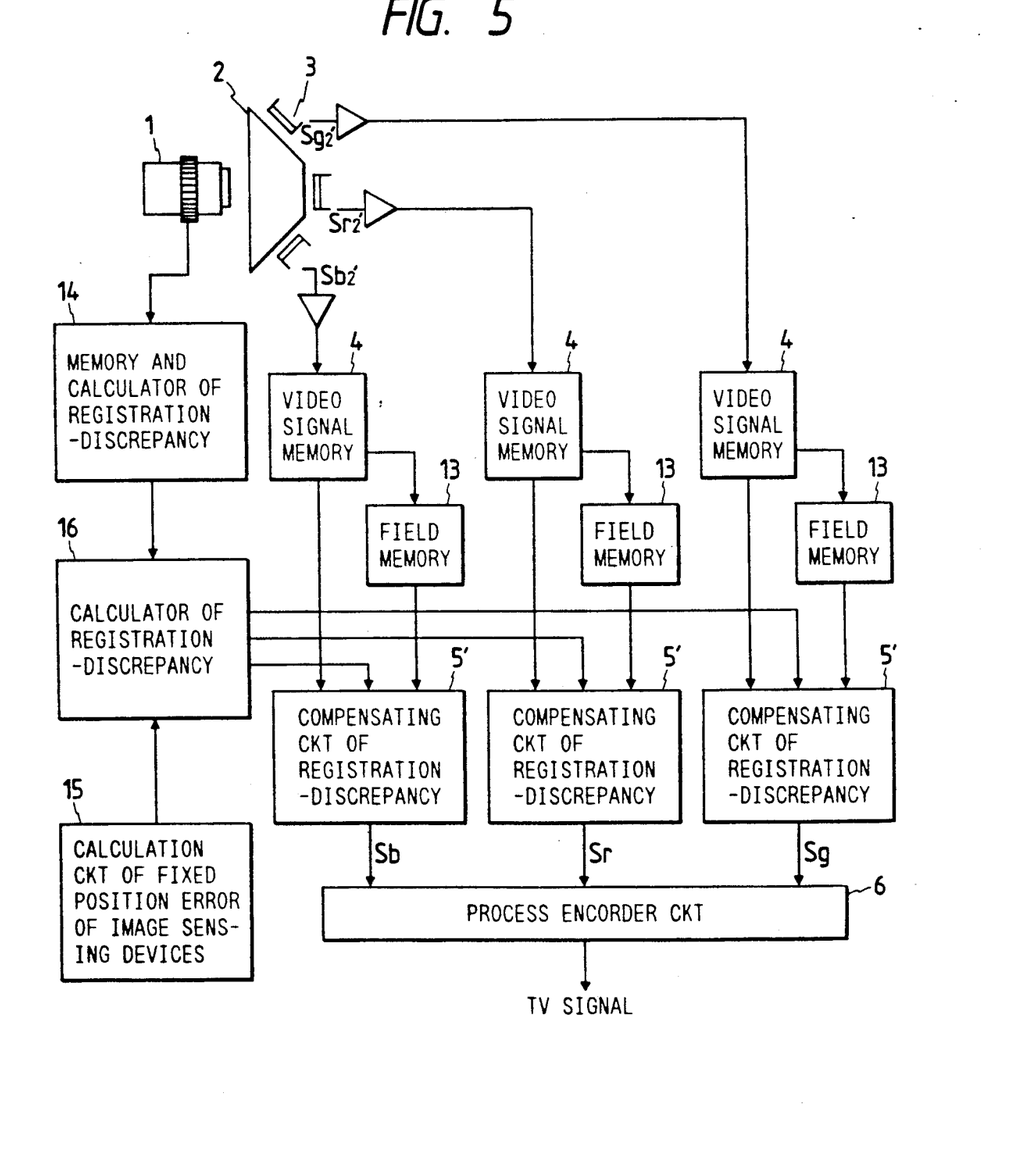
FIG. 5 is a schematic diagram of an arrangement of an apparatus according to a first preferred embodiment of the present invention.
Figure 6:
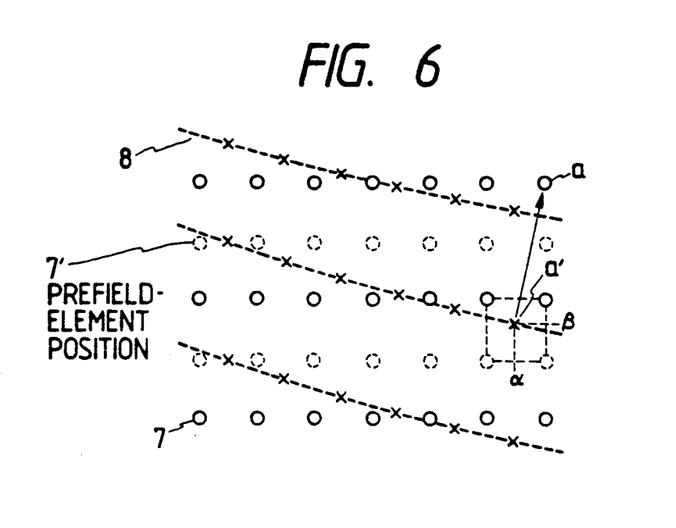
FIGS. 6 and 7 are illustrations for explaining operations of a major portion of the above-described apparatus according to the present invention.

In FIG. 5, a first preferred embodiment of the present invention is shown. In FIG. 5, light which has passed through an optical lens 1 and a prism 2 is converted into an electric signal by a solid-state image pickup device 3 in the conventional manner, and output as output signals Sr2', Sg2' and Sb2'. At least, more than M lines of video signals within the respective output signals are once stored in a video signal memory 4. On the other hand, 1 field signals Sr1', Sg1' and Sb1' which had been previously output during the preceding field (it should be noted that since these signals correspond to the output signals acquired during the preceding field, they are omitted in the figure) are previously stored in a field memory 13. FIG. 6 is an illustration for representing that a position of an arranged element 7' of the prefield video signal Sr1' is also added to the schematic diagram shown in FIG. 2, relating to the positional relationship of, for instance, the arranged element of the output signal Sr2 (not shown).

In a compensating circuit 5' for a discrepancy of registration represented in FIG. 5, the below-mentioned calculation is performed, and a color signal, e.g., "Sr" the discrepancy of registration of which has been compensated is output therefrom. In other words, from the arranged elements of the 2 field video signals, also containing the prefield video signal stored in the field memory, four adjoining points of the elements (in general, M×N points) are extracted, and values at a predetermined position a' of a discrepancy of registration are obtained by internally inserting these values of the element points. Then, an interpolation signal thereof is used as a signal of a correct corresponding position of an arranged element, so that the color signal, the discrepancy of registration of which has been corrected, is output. The signal stored within the video signal memory 4, the discrepancy of registration of which has been compensated, is restored in the field memory 13, whereby the stored video signal is prepared for a calculation in the succeeding field. The color signals Sr, Sg, Sb the discrepancies of registration of which have been compensated in the similar method are supplied to a process-encoder circuit 6 (a circuit for converting a color signal into a TV signal) which outputs a television signal having the registration error.

It should be noted that a memory and calculator 14 of a registration error for the lens, as represented in FIG. 5, corresponds to a circuit for calculating an amount of the registration discrepancy (error) caused by the color aberration of the lens. The circuit arrangement of this circuit may be realized by employing a known circuit. A calculation circuit 15 of a fixed position error of image sensing devices corresponds to a circuit for storing the fixed position errors of the respective image sensing devices which occur in case that more than two image sensing devices are employed, and also for calculating the discrepancy of registration caused by this fixed position error. A calculator 16 of a discrepancy of registration corresponds to a circuit for calculating all amounts of in the registration discrepancy caused by the color aberration of the lenses, the fixed position errors of the image sensing devices, and others. The compensating circuit 5' of the discrepancy of registration calculates the interpolation signal in accordance with the amount of the registration discrepancy calculated by this calculator 16 of the discrepancy of registration.

As previously described, in the present circuits, as to the arranged elements of the signals used for interpolating the discrepancy of registration, the number of the elements in the vertical direction becomes approximately two times higher than that of the arranged elements of the conventional 1-field signal. As a result, it an image having resolution higher than that of the image obtained by utilizing the conventional registration correction circuit can be produced.

Figure 7:
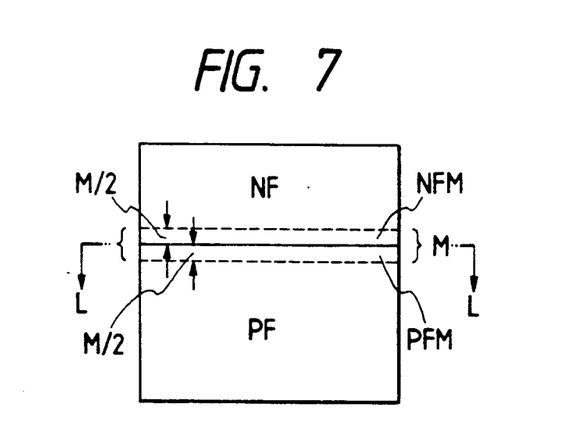

In the circuit shown in FIG. 5, after the calculation has been performed, the signals must be restored from the video signal memory 4 to the field memory 13. However, such a signal restoring operation may be avoided with memory having an arrangement schematically represented in FIG. 7. New signals are successively stored therein, and an interpolation signal is calculated by utilizing total M lines of the signals in both upper and lower directions thereof.

Figure 8:
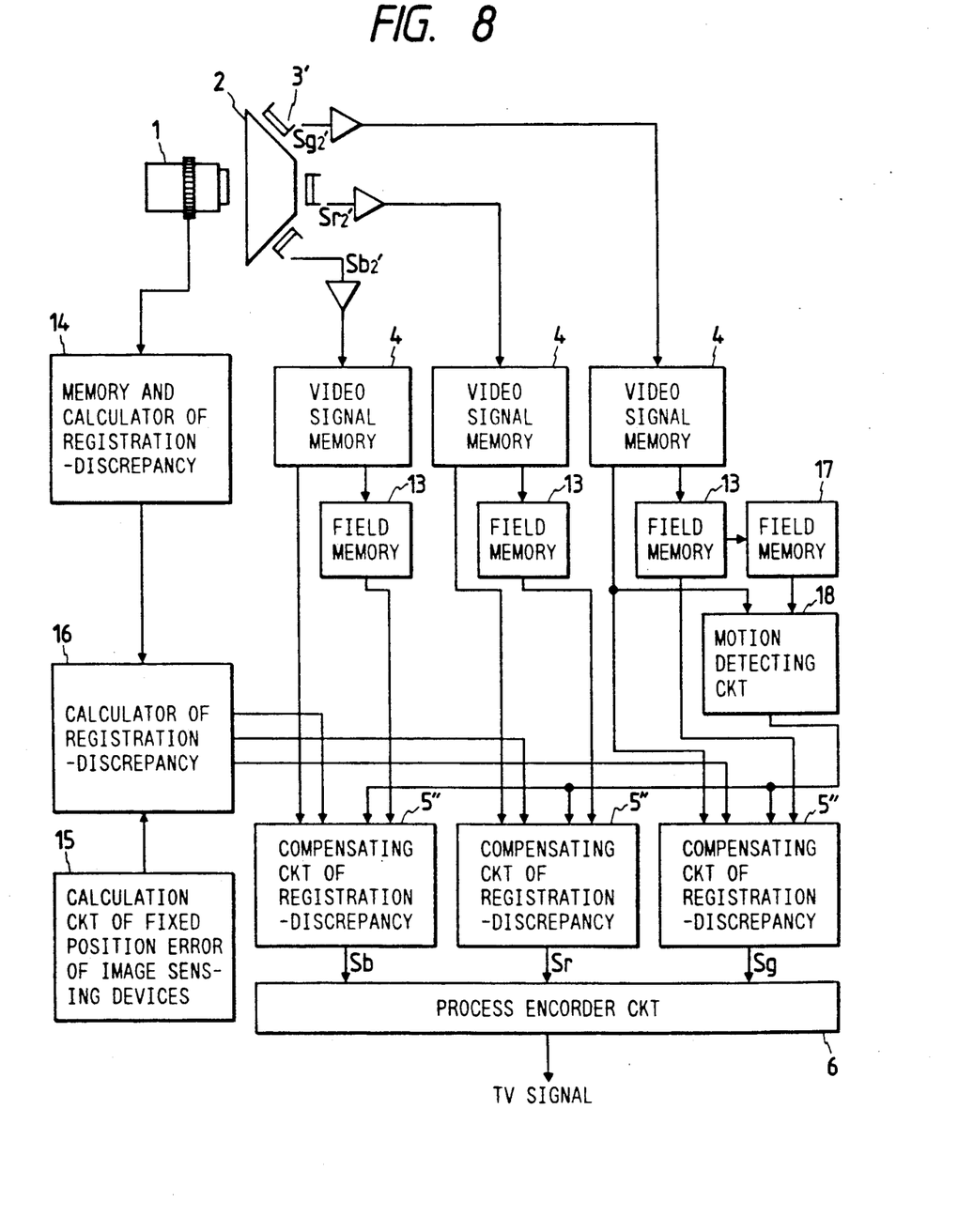
FIG. 8 is a schematic diagram of an arrangement of an apparatus according to a second preferred embodiment of the present invention.

FIG. 8 is a schematic block diagram of an image pickup apparatus according to a second preferred embodiment of the present invention. In the preferred embodiment shown in FIG. 5, since the interpolation signal for the discrepancy of registration is calculated by utilizing the continuous 2-field signals, an error occurs in a region where an image moves. The second preferred embodiment intends to prevent such an error occurring in the region where this image moves.

To this end, in the circuit shown in FIG. 8, with respect to at least one color signal in the circuit shown in FIG. 5, another signal (i.e., a G signal Sg3' in FIG. 8) in one previous field is stored (note that the signal Sg3' is omitted). In a motion detecting circuit 18 when, a detection is made of a motion of an image from 2 field signals Sg2' and Sg3' within 3 field signals which are continuously output from the solid-state image pickup element 3, a motion detecting signal is output. That is to say, assuming now that when a difference between, for instance, the signals Sg2' and Sg3' is calculated, and either a level of a difference signal ΔSg2 thereof, or a level ratio thereof exceeds a predetermined level "P", the image has moved and, the signals of motion-detections are output to the respective compensating circuits 5" for the discrepancies of registration. Then, in each of these compensating circuits 5" for the discrepancies of registration, when no signal of motion-detection is input, an interpolation signal Sg for interpolating a discrepancy of registration is calculated from signals of (M×N) pieces of arranged elements (M, N being an integer) whose corresponding positions on the light receiving plane are adjacent to each other within the arranged elements of the 2 field signals Sg2' and Sg1' which are continuously output, similar to the preferred embodiment shown in FIG. 5. On the other hand, when the signal of motion-detection is input, the interpolation signal Sg for interpolating the discrepancy of registration is calculated from signals of (M'×N') pieces of arranged elements (M', N' being an integer) whose corresponding positions on the light receiving plane are adjacent to each other within the arranged elements of the 1 field signal Sg2', similar to the conventional calculation.

The signals which have been already calculated and stored in both the video signal memory 4 and field memory 13 are restored in both the field memory 13 and field memory 17 so as to prepare another calculation at the next field. Thereafter, the color signals Sr, Sg and Sb, the discrepancies of registration of which have been corrected in the similar method, are supplied to the process-encoder circuit 6 so as to output a television signal having no registration discrepancy.

As previously stated, in the above-described circuit, as to the arranged elements of the signals used for interpolating the discrepancy of registration, the number of the elements in the vertical direction thereof becomes about two times higher than that of the arranged elements of the conventional 1 field signal. Even though signals calculated by utilizing only the arranged elements of the 1 field signal within the region where the image moves are used, the resultant image in the region where the stationary image is present can still have higher resolution than that of the image obtained by using the conventional registration correcting circuit, because a better image, having less error during the interpolation, can be obtained in the region where the image moves.

Also in the circuit shown in FIG. 8, a video memory capable of storing approximately two field signals is prepared into which new signals are successively stored, and an interpolation signal is calculated by utilizing M lines signals in the upper and lower lines thereof, whereby the above-described restoring operation may be avoided.

Figure 9:
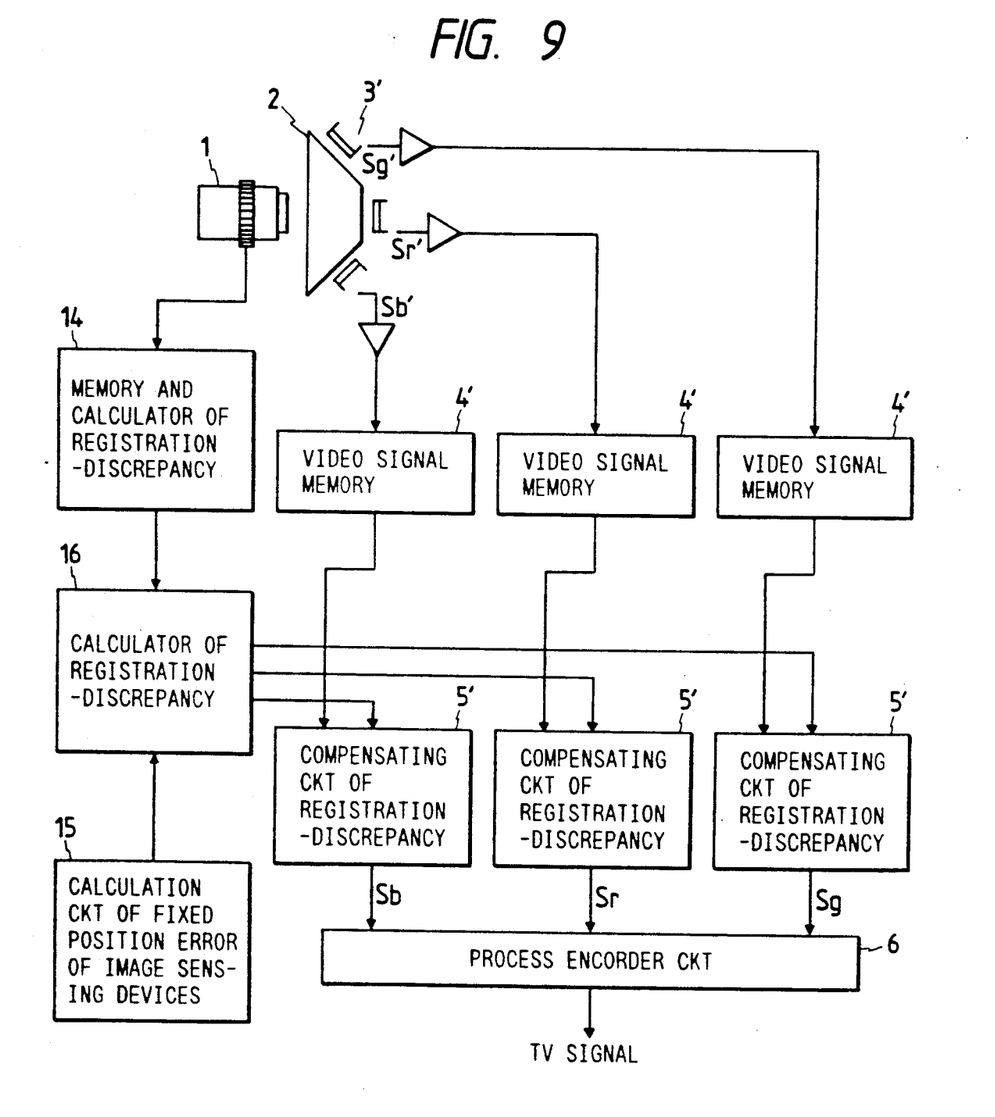
FIG. 9 is a schematic diagram of an arrangement of an apparatus according to a third preferred embodiment of the present invention.
Figure 10:
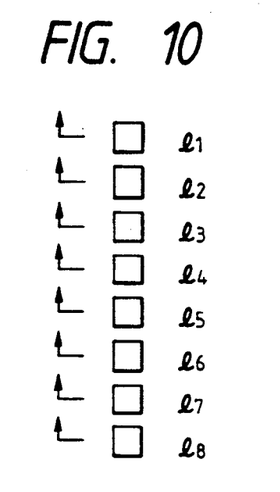
FIG. 10 is a diagram of an arrangement of a major part of the above-described preferred embodiment according to the present invention.
Figure 11:
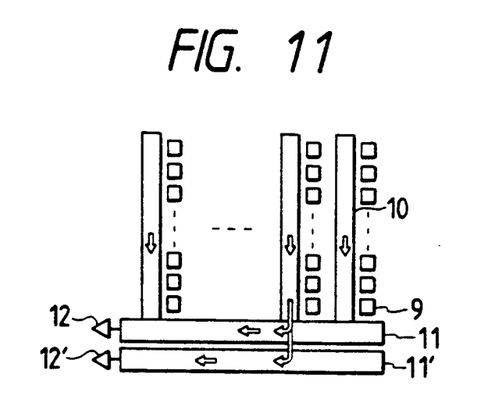
FIG. 11 is an illustration of the major part of the above-described preferred embodiment according to the present invention.

In FIG. 9, there is shown a third preferred embodiment of the present invention. In this preferred embodiment, as schematically illustrated in FIG. 10, there is employed an image pickup element having such a construction allowing all of signals of pixels on the image pickup element to be independently read out. This is realized by such an improvement, as shown in FIG. 11, that the stage number of the vertically arranged CCD 10 of the image sensing device shown in FIG. 3 is made twice, indicated by two pieces of the horizontally arranged CCD 11 and 11' furthermore, the signal having the pixel numbers two times higher than those of the conventional signal can be independently read out.

When such an image sensing device is employed, from the respective image pickup elements 9 shown in FIG. 9, signal charges of all of the pixels corresponding to the arranged element numbers of the successively continuous 2 field signals which are read during the interlace operation can be separately read out every field. Accordingly, in both the video signal memory 4' and compensating circuit 5' of the registration discrepancy, the interpolation signal for interpolating the discrepancy of registration is calculated from the signals of (M×N) pieces of the adjoining arranged elements (M, N being an integer) among the 1 field signal having the element numbers two times higher than those of the conventional 1 field signal. Then, the color signals Sr, Sg and Sb the registration discrepancies of which have be corrected in the similar manner are furnished to the process-encoder circuit 6 so as to output a television signal having no discrepancy of registration.

As previously explained, with respect to the arranged elements of the signals used for interpolating the discrepancy of registration in accordance with this preferred embodiment, the number of the elements in the vertical direction becomes approximately two times higher than those of the arranged elements, in the vertical direction, of the conventional 1 field signal. As a consequence, an image having higher resolution than that of the image produced by employing the conventional registration correction circuit is produced.

Figure 12:
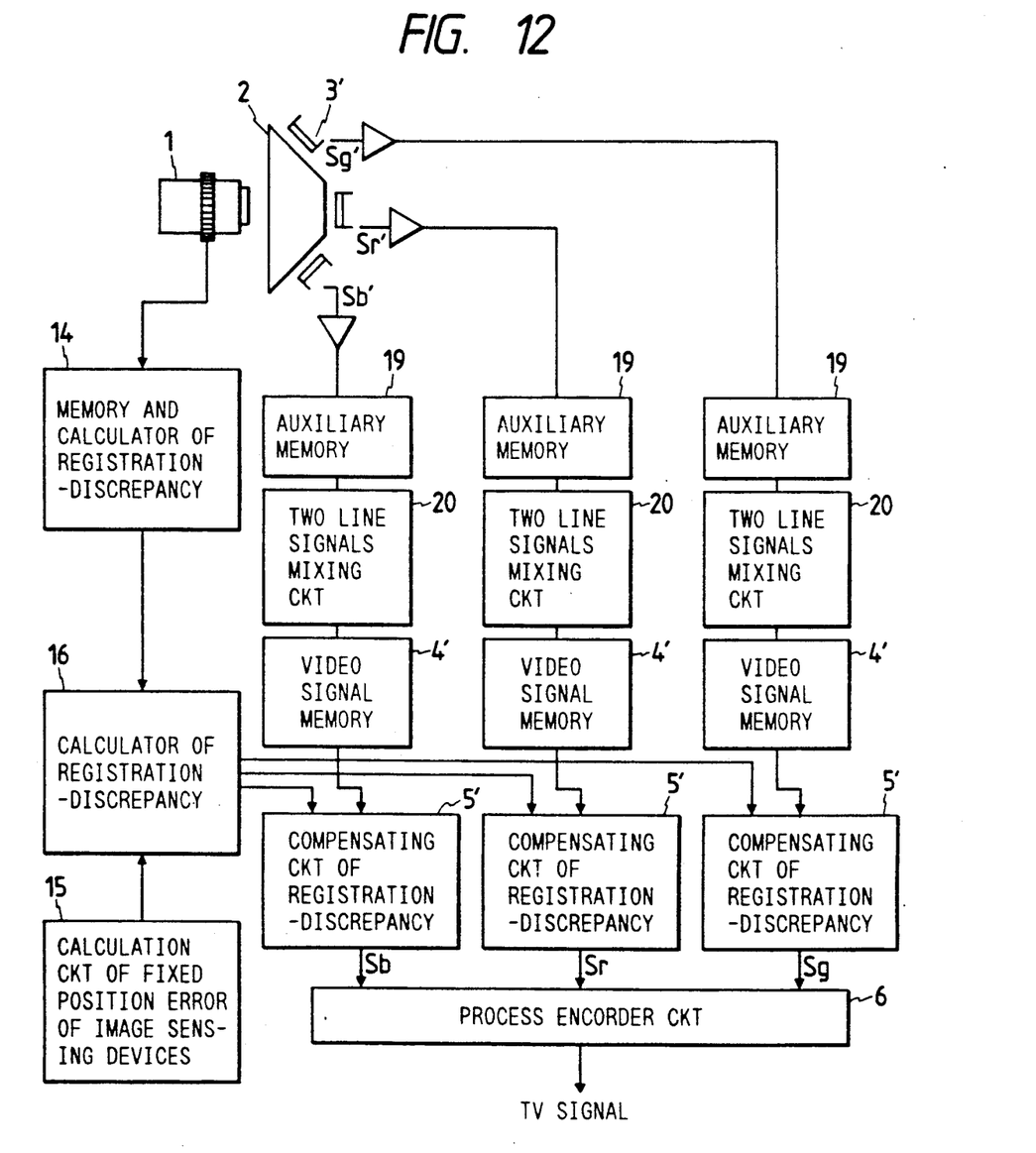
FIG. 12 is a diagram for illustrating a schematic arrangement of a fourth preferred embodiment according to the present invention.

FIG. 12 is a schematic block diagram of an image pickup apparatus according to a fourth preferred embodiment of the present invention. Meanwhile, in the third preferred embodiment, when, for instance, a predetermined position a' of a discrepancy of registration is present at an intermediate position between a line "$1_4$" and another line "$1_5$" shown in FIG. 10, an interpolated value S4 with respect to this position a' is calculated by the following equation, for example;

$$S4 = (S14' + S15')/2 \qquad (1)$$

As to the level of this signal S4 obtained by utilizing such an interpolation method, a level of the 1 line signal level S4 shown in FIG. 10 is substantially equal to a 1 line signal level S14' represented in FIG. 10. As a consequence, in comparison with the conventional method for reading the signal after two lines are mixed with each other as represented in FIG. 4a, the level of the output signal is equal to approximately a half therefore, and therefore a signal-to-noise ratio is deteriorated by approximately 6 dB. In accordance with this preferred embodiment, the deterioration of the sensitivity is improved while substantially maintaining the resolution of the signal which has been corrected in the third preferred embodiment.

Figure 13:
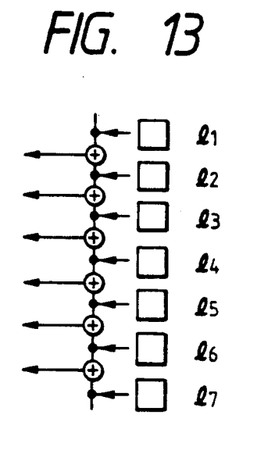
FIGS. 13 and 14a are illustrations for explaining an operation of a major portion of the above-described preferred embodiment; and, FIG. 14b is a block diagram of the major portion of the above-explained preferred embodiment.

To this end, this preferred embodiment employs an image pickup element 3' having such a construction that signal charges of all of pixels corresponding to the arranged element numbers of the mutually continuous two field signals which are read during the interlace operation, can be read out independently every field, similar to third preferred embodiment. The signal read out from this image sensing device 3' is once stored in an auxiliary memory 19, and thereafter a summation of the mutually adjoining two line signals is obtained in a two line signals mixing circuit 20. A combination of this mixing calculation is schematically illustrated in FIG. 13. Thus the calculated signal has the same line number as that of the output signal from the image sensing device. In other words, the signal owns the substantially same arranged elements as those of the mutually continuous 2 field signals which are read out during the interlace operation.

As a consequence, an interpolation signal for interpolating a discrepancy of registration is calculated via both a video signal memory 4' and a compensating circuit 5' similar to those of the third preferred embodiment from mutually adjoining $M \times N$ pieces (M and N being an integer) of arranged element signals corresponding to output signals of an image sensing element, and to signals of $(M+1) \times N$ pieces (M, N being an integer) of arranged elements. Then, color signals Sr, Sg, Sb which have been similarly corrected as to the discrepancy of registration are supplied to a process encoder circuit 6 so as to output a television signal having no discrepancy of registration.

With respect to the arranged elements of the signals used for interpolating the discrepancy of registration, the number of the elements along the vertical direction thereof becomes substantially two times higher than that of the arranged elements of the conventional 1-field signal in accordance with this preferred embodiment. As a result, an image having higher resolution than that of the image which is produced by employing the conventional registration correction circuit is obtained. In addition, the level of the summation signal which is not yet interpolated is equal to, for instance, $$S4 = S14 + S15 \quad (2)$$

This implies that the level of the summation signal becomes approximately two times higher than that of the third preferred embodiment. About 3 dB in the signal-to-noise ratio can be improved, as compared with that of the third preferred embodiment.

Figure 14A:
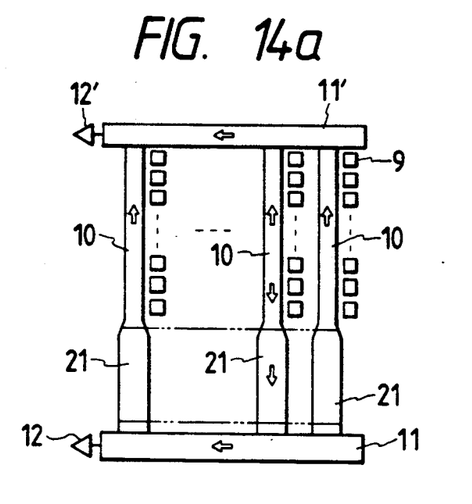

It should be noted that as the constructions of the image pickup elements employed in the third and fourth preferred embodiments, the construction as represented in FIG. 14a other than that shown in FIG. 11 may be utilized.

Figure 14B:
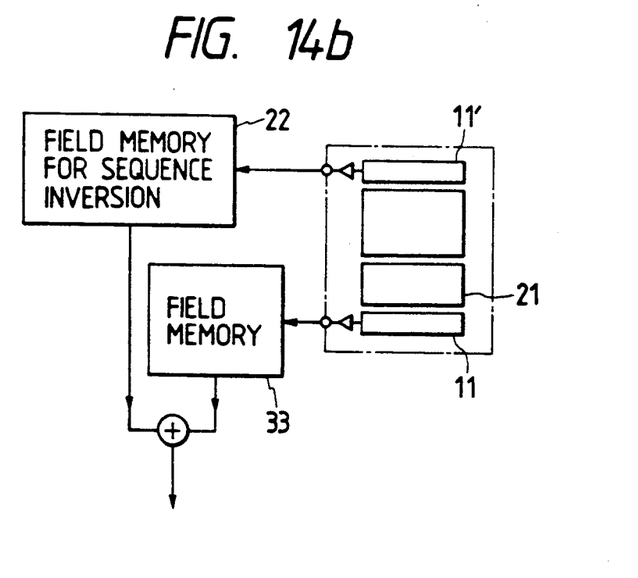

That is to say, there is separately provided a horizontally arranged CCD 11' at an opposite side of a memory unit 21 of FITCCD in which the memory unit 21 is employed between the vertically arranged CCD 10 and the horizontally arranged CCD 11. Then, for instance, the signal charges in the pixel rows of the odd (even) lines are transferred at high speed within the vertically arranged CCD 10 to the memory unit 21. On the other hand, after the signal charges in the pixel rows of the even (odd) lines have been transferred, they are immediately read out to the vertically arranged CCD 10. Subsequently, this signal charge is sequentially transferred every 1 horizontal line to the horizontally arranged CCD 11' in a direction opposite to the transferring direction of the signal charges in the odd (even) lines, and output together with the signal charge temporarily stored in the memory unit 21 via the horizontally arranged CCDs 11 and 11' every 1 horizontal line. Then, after the signal output from the horizontally arranged CCD 11' is once stored in a field memory 22 for sequence invention similar to FIG. 14b, a read sequence may be reversed. Furthermore, it is obvious that the construction of the image sensing device shown in FIG. 14a may be formed as such a construction that another memory unit different from the above-described memory unit 21 is formed between the vertically arranged CCD 10 and horizontal arranged CCD 11', and the signal charges of both the odd lines and even lines are transferred at high speed.

Although the descriptions have been made to such circuit arrangements according to the previous preferred embodiments, in which three color signals R, G and B were corrected, in a normal case, one (for instance a green signal) of these color signals is used as a reference signal, and only a discrepancy of registration of this reference color signal may be corrected.

Although it has been described that the three color signals R, G and B were directly obtained from the image sensing element, it is apparent that the present invention may be applied to such a case that a complementary color filter is utilized.

It is also obvious that when the pixel arrangement of the image sensing device is not a grid form, but a fully filled delta form, for instance, signals from three adjoining pixels may be interpolated in order to be fitted to this delta arrangement.

Also, although only correction of a discrepancy of registration has been described, the present invention may be obviously applied to a filtering process of an enhancer and the like which utilize $(M \times N)$ pieces of mutually adjoining arranged elements.

As previously described, according to the present invention, the element number, in the vertical direction, of the arranged elements of the signal used for interpolating the discrepancy of registration becomes approximately two times higher than that of the arranged elements of the conventional 1 field signal. As a consequence, an image having higher resolution than that of the image produced by utilizing the conventional registration correction circuit is produced.

What is claimed is:

1. An image pickup apparatus including an optical lens, an image pickup device for converting light passing through said optical lens into an electrical video signal and a video signal memory, said image pickup apparatus comprising:

the image pickup device for continuously outputting video signals in a first and a second field;

the video signal memory for storing the video signals in two fields;

means for selecting and reading signals of $(M \times N)$ pieces of arranged elements (M, N being an integer respectively), the arranged elements including first arranged elements of the first field on a light receiving plane which are mutually adjoined with each other and second arranged elements of the second field; and means for correcting a registration by interpolating the signals of (M×N) pieces of arranged elements, whereby the number of signals interpolated is twice the number of signals of one field for improved resolution.

2. The image pickup apparatus of claim 1 wherein said video signal memory includes means for storing a first field signal prior to a second field signal.

3. The image pickup apparatus of claim 1 wherein said video signal memory includes means for temporarily storing a third field signal therein so as to be employed together with a succeeding field for a calculation purpose.

4. An image pickup apparatus including an optical lens and an image pickup device for converting light passing through said optical lens into an electric signal, said image pickup apparatus comprising:

a video signal memory device, including two field memories, for storing three field signals continuously output from the image pickup device;

a motion detection circuit for detecting motion of an image while the image pickup device continuously outputs signals in 3 fields wherein a pixel point where a small motion occurs is calculated from a signal of (M×N) pieces of arranged elements (M, N being an integer respectively), of the three fields mutually adjoined with each other and wherein a pixel point where a large motion occurs is calculated from signals of (M'×N') pieces of arranged elements of only one field (M', N' being integers respectively); and, means for correcting a registration by interpolating using the (M×N or M'×N') pieces of arranged elements.

5. An image pickup apparatus including an optical lens and at least two image pickup devices for converting light passing through the optical lens into electric signals, said image pickup apparatus comprising:

means for reading a first signal having a same element number as a second signal in a mutually continuous field during an interlace operation wherein only the first signal is read.

6. The image pickup apparatus of claim 1, further comprising:

memory means for storing a fixed position error introduced by fixing the optical lens of said image pickup device; and, means for calculating an amount of registration error caused by said fixed position error.

7. An image pickup apparatus as claimed in claim 5, wherein an interpolation signal for interpolating a discrepancy of registration is calculated from signals of (M×N) pieces of mutually adjoined arranged elements (M, N being an integer respectively) among an arrangement element of a 1 field signal having a same element number as arranged element numbers of 2 field signals which are mutually continued and read during the interlace operation, and derived from said image pickup element.

8. The image pickup apparatus a claimed in claim 5, wherein a new arranged element constructed of (M×N) elements is formed which is obtained by summing two element signals vertically in contact with each other from signals of (M+1)×N pieces of mutually adjoining arranged elements among an arranged element of the 1 field signal having the same element number as an arranged element number of a mutually continuous 2 field signals which are output from said image pickup elements and read out during the interlace operation, and an interpolation signal for interpolation is obtained from a newly formed signal of the M×N arranged elements.

9. An image pickup apparatus comprising:

an image sensing area composed of light sensing elements with a matrix array of pixel rows;

a vertically arranged CCD which has been light-shielded and the signal charges of which are transferred to one side of said image sensing area;

a memory unit located on another side of said image area, for temporarily storing signal charges in 1 field;

a horizontally arranged CCD which outputs signal charges separately in a horizontal direction to the one side of said image sensing area and also to said memory unit;

transmitting means for transmitting at high speed the signal charges of said pixel rows in the odd lines through the vertically arranged CCD to said memory unit;

outputting means on every one horizontal line for signal charges temporarily stored on said memory unit via said horizontally arranged CCD;

reading out means for reading out the signal charges of the pixel rows in the even lines to the vertically arranged CCD after the signal charges of the pixel rows in the odd lines have been transferred at high speed to the memory unit;

transferring means for transferring the signal changes of said vertically arranged CCD in a direction opposite to the transfer direction of the signal charges of the pixel rows in said odd lines: and, output means for every one horizontal line via a horizontally arranged CCD separately provided at a side opposite to said memory unit.

10. The image pickup apparatus of claim 4, further comprising:

memory means for storing a fixed position error introduced by fixing the optical lens of said image pickup device; and, means for calculating an amount of a registration error caused by said fixed position error.

11. The image pickup apparatus of claim 5, further comprising:

memory means for storing a fixed position error introduced by fixing the optical lens of said image pickup device; and, means for calculating an amount of a registration error caused by said fixed position error.

12. A method for correcting a registration of an image obtained using an image pickup apparatus including a plurality of image pickup devices, the method comprising steps of:

generating a first field of signals by each of the image pickup devices, storing the first field in a first storage device;

generating a second field of signals by each of the image pickup devices;

transferring the first field to a second storage device;

storing the second field in the first storage device;

correcting the registration by a compensating circuit by interpolating signals of both the first and second fields to obtain a corrected field; and, storing the corrected field in the second storage device whereby interpolating the signals of two fields instead of only one field increases the resolution of the image.

* * * * *